(12) United States Patent
Shinde

(10) Patent No.: US 7,327,807 B2
(45) Date of Patent: Feb. 5, 2008

(54) METHOD FOR CONTROLLING GENERATION OF TRANSMISSION POWER CONTROL INFORMATION, METHOD OF CONTROLLING CHARACTERISTICS OF RECEIVER CIRCUIT BASED ON OVERFLOW INFORMATION, AND CDMA COMMUNICATION APPARATUS

(75) Inventor: Hiroki Shinde, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 646 days.

(21) Appl. No.: 10/477,518

(22) PCT Filed: Mar. 18, 2003

(86) PCT No.: PCT/JP03/03218

§ 371 (c)(1),
(2), (4) Date: Nov. 19, 2003

(87) PCT Pub. No.: WO03/079580

PCT Pub. Date: Sep. 25, 2003

(65) Prior Publication Data

US 2004/0174926 A1  Sep. 9, 2004

(30) Foreign Application Priority Data

Mar. 20, 2002  (JP) ............................. 2002-079494

(51) Int. Cl.
*H04L 27/00* (2006.01)

(52) U.S. Cl. ..................... 375/324; 375/345; 455/522

(58) Field of Classification Search ................ 375/141, 375/147, 317, 319, 344–345; 455/69, 522
See application file for complete search history.

(56) References Cited

U.S. PATENT DOCUMENTS 5,280,354 A * 1/1994 Nakamura ................... 348/688

(Continued)

FOREIGN PATENT DOCUMENTS

JP  8-288881  11/1996

(Continued)

OTHER PUBLICATIONS

English Language Abstract of JP 2001-284996.

(Continued)

*Primary Examiner*—Chieh M. Fan
*Assistant Examiner*—Freshteh N Aghdam
(74) *Attorney, Agent, or Firm*—Greenblum & Bernstein, P.L.C.

(57) ABSTRACT

A wireless communication apparatus capable of minimizing a danger involved in transmit power control based on control information containing errors and securing reliability of a system. In this apparatus, an overflow error detector and a reception state monitoring section acquire information on overflows of the analog to digital converter. Then, the reception quality decision section evaluates reliability of the received signal considering this overflow information and removes the signal with a reliability determined to be low from the basic data for generation of transmit power control information.

5 Claims, 8 Drawing Sheets

U.S. PATENT DOCUMENTS

| | | | |
|---|---|---|---|
| 5,689,815 A | 11/1997 | Yamazaki et al. | |
| 6,175,744 B1 | 1/2001 | Esmailzadeh et al. | |
| 6,301,485 B1 | 10/2001 | Lee | |
| 6,341,214 B2 | 1/2002 | Uesugi | |
| 6,748,200 B1* | 6/2004 | Webster et al. | 455/234.1 |
| 6,782,061 B2* | 8/2004 | Ichihara | 375/345 |
| 6,804,501 B1* | 10/2004 | Bradley et al. | 455/138 |
| 7,064,749 B1* | 6/2006 | Enmei | 345/174 |
| 7,065,164 B1* | 6/2006 | Sakima | 375/345 |
| 2002/0027897 A1* | 3/2002 | Moulsley et al. | 370/342 |
| 2002/0151286 A1* | 10/2002 | Ruohonen et al. | 455/182.2 |
| 2002/0160733 A1* | 10/2002 | Kajita | 455/234.1 |
| 2003/0007103 A1* | 1/2003 | Roy | 348/731 |
| 2004/0196916 A1* | 10/2004 | Bohnke et al. | 375/260 |
| 2006/0014507 A1* | 1/2006 | Giancola et al. | 455/232.1 |

FOREIGN PATENT DOCUMENTS

| | | |
|---|---|---|
| JP | 2001-7763 | 1/2001 |
| JP | 2001-284996 | 10/2001 |

OTHER PUBLICATIONS

English Language Abstract of JP 2001-7763.

English Language Abstract of JP 8-288881, Pub. Date: Nov. 1, 1996.

* cited by examiner

METHOD FOR CONTROLLING GENERATION OF TRANSMISSION POWER CONTROL INFORMATION, METHOD OF CONTROLLING CHARACTERISTICS OF RECEIVER CIRCUIT BASED ON OVERFLOW INFORMATION, AND CDMA COMMUNICATION APPARATUS

TECHNICAL FIELD

The present invention relates to a method of controlling generation of transmit power control information, a method of controlling characteristics of a reception circuit based on overflow information and a CDMA communication apparatus.

BACKGROUND ART

In a CDMA communication system, transmit power control is a technology essential to lessening a so-called near-far problem and increasing a subscriber capacity.

For example, with regard to a downlink, transmit power of a base station needs to be set to a minimum level necessary to guarantee communication quality to reduce interference between mobile stations. The level of interference between mobile stations determines the subscriber capacity of the base station.

The subscriber capacity in a CDMA communication system is determined by modeling a cell/sector configuration and propagation loss, etc., and estimating the probability that transmit power which is determined according to the state of a mobile station will exceed maximum transmit power of the base station.

Such calculations are complicated and always involve ambiguity. A W-CDMA system needs to secure communication quality and secure a maximum number of subscribers as well. Therefore, insufficient accuracy of transmit power control may cause a failure of the system.

When closed loop control of transmit power is applied, both the base station and mobile station perform transmit power control based on a TPC bit (transmit power control bit) included in a received signal.

As described above, transmit power control using a TPC bit is required to have the highest possible degree of accuracy.

However, the TPC bit itself actually includes errors for various reasons. The inventor of the present application has noticed a conversion error of an AD converter as one of the causes for such errors.

That is, a received signal is affected by fading and its amplitude often fluctuates a great deal.

At this time, if the amplitude of a received signal exceeds the dynamic range of an AD converter at the input stage of a receiver and at the same time amplitude adjustment by AGC (auto gain control) cannot follow its amplitude variations, the conversion output of the AD converter is clamped by a maximum value or minimum value of the output of the AD converter, causing a small amount of loss of information.

Reception processing and generation of transmit power control information based on the data containing such errors caused by AD conversion give rise to errors in transmit power control.

No matter how small those errors may be, when errors included in TPC bits sent from many mobile stations are accumulated, there is a danger that the accuracy of transmit power control at the base station may decrease, making it impossible to secure the number of subscribers acceptable to the system.

For example, gain correction by an amplifier before the receiver through feedback control (AGC) cannot absorb quicker variations in the received signal than a time constant of control. Therefore, when intensity of the reception field in an arbitrary section is measured, variations cannot be absorbed by gain correction of the amplifier and the amplitude level of the received signal exceeds the dynamic range of the AD converter, failing to obtain an accurate AD conversion result and resulting in errors included in the calculated field intensity value itself.

The reception field intensity not only serves as means to know the current reception level at the mobile terminal but also forms a basis for generation of transmission control information to be sent to the base station and has an extremely important meaning. Therefore, the presence of errors in the reception field intensity may become a cause for a reduction of reception quality. This is especially noticeable in a CDMA scheme which controls power of transmission and reception meticulously.

That is, the number of users of the CDMA communication system is increasing drastically in recent years, and pursuing communication quality and the number of subscribers to the maximum with consideration given to such an increase of subscribers leads to a problem that a tiny conversion error (latent error) due to saturation of an AD converter, which has been overlooked conventionally, may also cause errors in the mobile communication system itself.

DISCLOSURE OF INVENTION

It is an object of the present invention to provide a method of controlling generation of transmit power control information, a method of controlling characteristics of a reception circuit based on overflow information and a CDMA communication apparatus capable of reliably preventing an erroneous operation of a CDMA communication system, and by extension a failure of the system and guaranteeing reliability of the system.

The present invention acquires information such as the fact that a received signal has exceeded an allowable input dynamic range of an AD converter of a receiver, its frequency and distribution, etc., and decides reliability for the AD-converted received data in the process of calculating quality of the reception power and received signal based on the information.

Then, for example, data with low reliability is not used as a basis for calculating reception power or quality of the received signal. That is, by removing the data with low reliability from the basis for generating TPC bits, transmission of wrong TPC bits is minimized.

This makes it possible to reduce adverse influences of AD conversion errors on the mobile communication system and guarantees the reliability of the system as a consequence.

Furthermore, since the AD converter is provided at an entrance of a digital signal processing circuit, quickly using overflow information of this AD converter also allows control at unprecedentedly high speed. Furthermore, the overflow information of the AD converter can be easily acquired by adding a small number of redundant bits to the AD converter and can be easily implemented.

BEST MODE FOR CARRYING OUT THE INVENTION

With reference now to the attached drawings, embodiments of the present invention will be explained in detail below.

Embodiment 1

Figure 1:
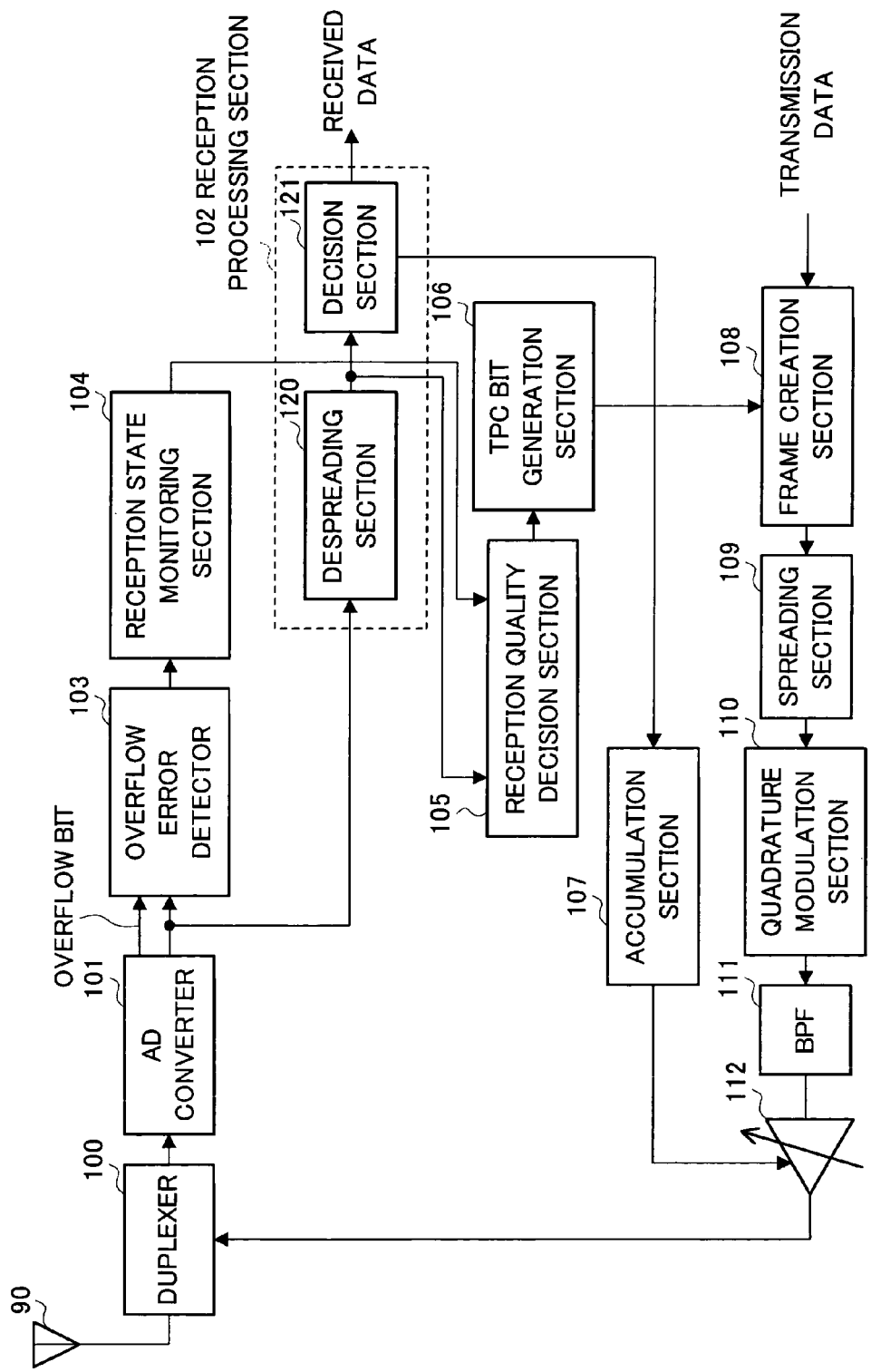
FIG. 1 is a block diagram showing an overall configuration of a CDMA communication apparatus according to Embodiment 1 of the present invention.

FIG. 1 is a block diagram showing an overall configuration of a CDMA communication apparatus (here, a mobile terminal) according to Embodiment 1 of the present invention.

Figure 13:
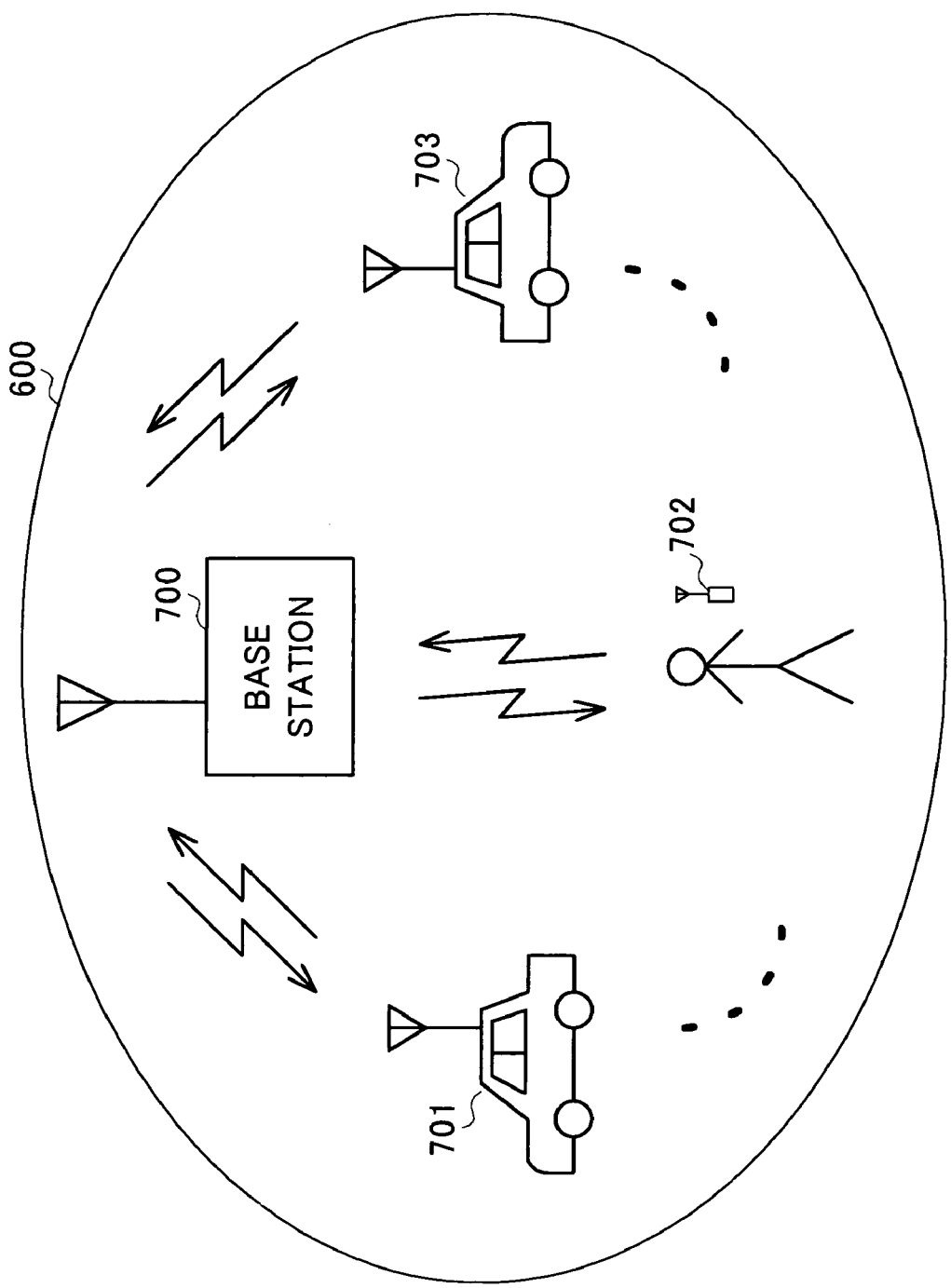
FIG. 13 illustrates closed loop control of transmit power in a CDMA communication system.

As shown in FIG. 13, CDMA scheme mobile terminals (701, 702, and 703) are located in a cell 600 under the control of a base station 700 and suppose the respective mobile terminals are carrying out transmit power control in a closed loop mode with the base station 700 to reduce interference of radio waves with one another.

A latent small error in transmit power control may result in a great cause for preventing the system from securing a scheduled subscriber capacity.

In view of this problem, the present invention decides validity/invalidity of received data considering also latent errors of received data (that is, errors underlying in the root of the received data) caused by overflows of an AD converter which has been conventionally overlooked and flexibly performs processing such as removing (discarding) data with low reliability from the basic data of transmit power control.

In the CDMA communication apparatus in FIG. 1, a signal received by an antenna 90 is input to an AD converter 101 through a duplexer 100 and converted to a digital signal.

The dynamic range of the digital output of the AD converter 101 has $2^n$ gray scales (e.g., 256 gray scales). Furthermore, the AD converter 101 has an overflow bit as a redundant bit.

When the amplitude of the input signal exceeds the input dynamic range of the AD converter 101 and an overflow occurs at the AD converter 101, this overflow bit indicates the occurrence of the overflow.

The overflow bit is input to an overflow error detector 103, which decides the presence/absence of an overflow and the direction in which the overflow appears (whether it is the + side or − side). This overflow information is given to a reception state monitoring section 104.

The reception state monitoring section 104 monitors the fact of occurrence of overflow at the AD converter 101 and the direction in which the overflow appears and gives the monitoring information to a reception quality decision section 105.

Furthermore, the normal conversion output of the AD converter 101 is input to a reception processing section 102 (including a despreading section 120 and a decision section 121), where despreading and demodulation processing are carried out and received data is obtained as a consequence.

The decision section 121 carries out demodulation processing, extracts TPC bits included in the received signal (TPC bits sent from the base station) and gives them to an accumulation section 107 of the transmission system.

The reception quality decision section 105 has original functions of calculating an SIR (Signal Interference Ratio: ratio of a signal component to a noise component) of the despread signal, checking the interference state and deciding the reception quality.

However, in this embodiment, the reception quality decision section 105 decides the quality of the received signal considering not only the SIR but also information on the overflow of the AD converter 101 given from the reception state monitoring section 104.

For example, with respect to the data corresponding to an overflow which occurs at the AD converter 101, the reception quality decision section 105 decides that it is data containing many errors whose received signal has not been correctly converted and performs processing according to the decision result, for example, ignoring (discarding) the signal without using it. In this case, if necessary, alternate processing such as using immediately preceding data is carried out.

According to the decision result of the reception quality decision section 105, a TPC bit generation section 106 generates a TPC bit (transmit power control bit).

In this case, the received data with low reliability due to an overflow that has occurred at the AD converter 101 is removed from the basis for generation of TPC bits. This lessens the deterioration of accuracy of transmit power control.

On the other hand, the transmission system comprises a frame creation section 108, a spreading section 109, a quadrature modulation section 110, a band pass filter (BPF) 111, a variable gain amplifier 112 and an accumulation section 107.

When the frame creation section 108 assembles a transmission frame, a TPC bit generated by the TCP bit generation section 106 is inserted into a control channel. The transmission frame is spread by the spreading section 109, quadrature-modulated by the quadrature modulation section 110, subjected to a band restriction at the BPF 111, amplified by the variable gain amplifier 112 and then sent to the base station through the duplexer 100 and antenna 90.

The amplification factor (gain) of the variable gain amplifier 112 is adaptively controlled according to the state of the TPC bit stored in the accumulation section 107 and included in the received signal.

Thus, according to this embodiment, errors in the TPC bit which the mobile communication terminal (mobile station) transmits to the base station are reduced.

Embodiment 2

A feature of this embodiment is that not only the fact that an overflow has occurred at an AD converter but also the amount of the overflow is measured and the information is applied to quality evaluation of a received signal.

Figure 2:
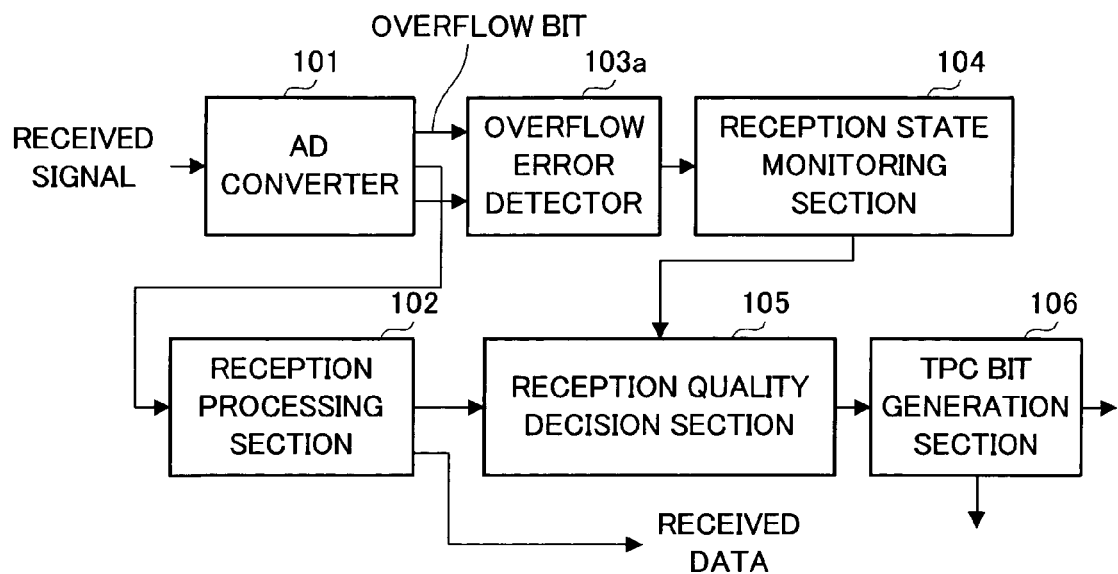
FIG. 2 is a block diagram showing a configuration of principal components of a CDMA communication apparatus according to Embodiment 2 of the present invention.

FIG. 2 is a block diagram showing a configuration of principal components of a CDMA communication apparatus according to Embodiment 2 of the present invention, that is, a block diagram showing only components related to the present invention out of the configuration of a mobile terminal (CDMA communication apparatus). The overall configuration is shown in FIG. 1, and so it is omitted.

The basic configuration of FIG. 2 is the same as that shown in FIG. 1. However, it is different in that the number of bits of overflow bits output from the AD converter 101 is increased and it has been adapted so as to be able to measure not only the fact that overflows have occurred but also the amount thereof.

Figure 3:
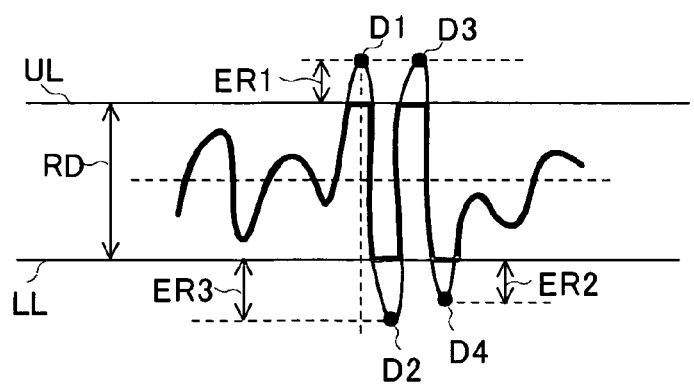
FIG. 3 illustrates an overflow mode at the AD converter in FIG. 2.

FIG. 3 illustrates an overflow mode at the AD converter 101.

In FIG. 3, "RD" denotes a dynamic range of the AD converter 101 and the voltage levels at four sampling points D1 to D4 are outside the dynamic range. Therefore, the converted outputs of these four points are clamped by an upper limit value UL and lower limit value LL of the dynamic range. As a result, conversion errors occur.

In this embodiment, not only the occurrence of an overflow but also the amount of overflow is measured by an overflow error detector 103a. The measured information is sent to a reception quality decision section 105 through a reception state monitoring section 104 and is used for an evaluation of reception quality.

For example, when the voltage level of an input signal exceeds the dynamic range to a notable degree, the reception quality decision section 105 performs processing such as removing the data from the basic data for generation of TPC bits.

Embodiment 3

A feature of this embodiment is to determine a segment for measuring an overflow of an AD converter, measure the occurrence of the overflow, frequency of occurrence and the amount of the overflow in this segment and apply these measurements to an evaluation of quality of a received signal (evaluation of validity/invalidity of a received signal).

Figure 4:
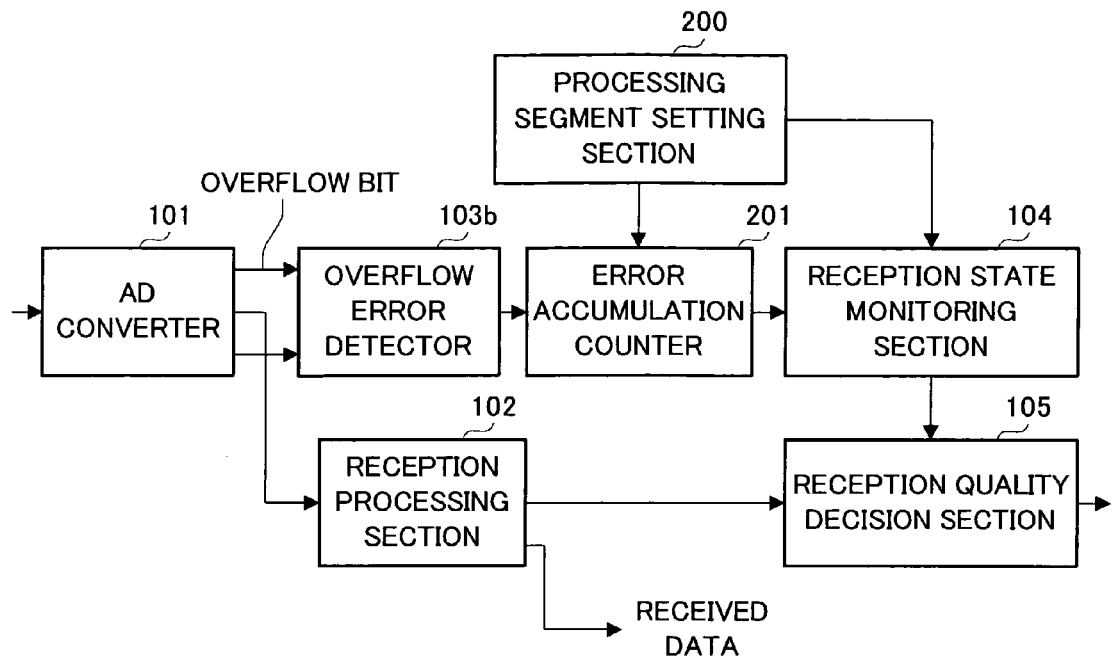
FIG. 4 is a block diagram showing a configuration of principal components of a CDMA communication apparatus according to Embodiment 3 of the present invention.

The basic configuration of a mobile terminal (CDMA communication apparatus) corresponding to this embodiment shown in FIG. 4 is the same as the configuration in FIG. 1 and FIG. 2. However, this embodiment differs in that it includes a processing segment setting section 200 and an error accumulation counter 201. Furthermore, an overflow error detector 103b is different in that it can measure the occurrence of an overflow, frequency of occurrence and amount of overflow.

The error accumulation counter 201 counts information such as the fact that an overflow has occurred, occurrence timing and amount of overflow only in a segment set by the processing segment setting section 200 and stores the information.

Information on the number of overflow errors that have occurred, the degree of the errors, etc., in a predetermined segment is sent to a reception quality decision section 105 through a reception state monitoring section 104 and used for an evaluation of reception quality.

Figure 5:
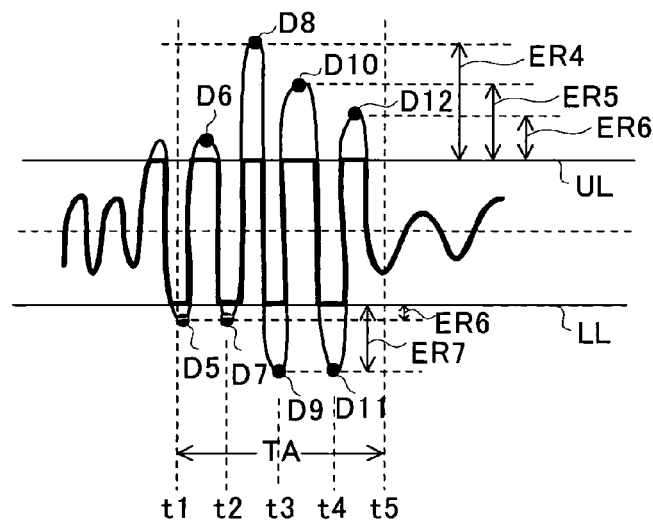
FIG. 5 illustrates an overflow mode at the AD converter in FIG. 4.

FIG. 5 shows an overflow mode at an AD converter 101. In FIG. 5, a segment TA from time t1 to t5 is the segment for deciding overflow errors.

In the case of FIG. 5, overflows have occurred at sampling points D5 to D12. Therefore, the conversion outputs at these sampling points are clamped by an upper limit value UL or lower limit value LL of the dynamic range. In the figure, "ER4" to "ER8" denote their respective amounts of overflow.

When, for example, errors whereby an amount of overflow exceeds a predetermined value occur a predetermined number of times or more, the reception quality decision section 105 decides that the received data in the segment has low reliability and performs processing such as removing the received data from a basis of generation of TPC bits.

This embodiment adopts a method of monitoring a reception state which dynamically changes.

According to this method, it is possible to comprehensively decide how overflow errors occur and thereby decide the validity/invalidity of the received data more accurately and more efficiently.

Embodiment 4

Figure 6:
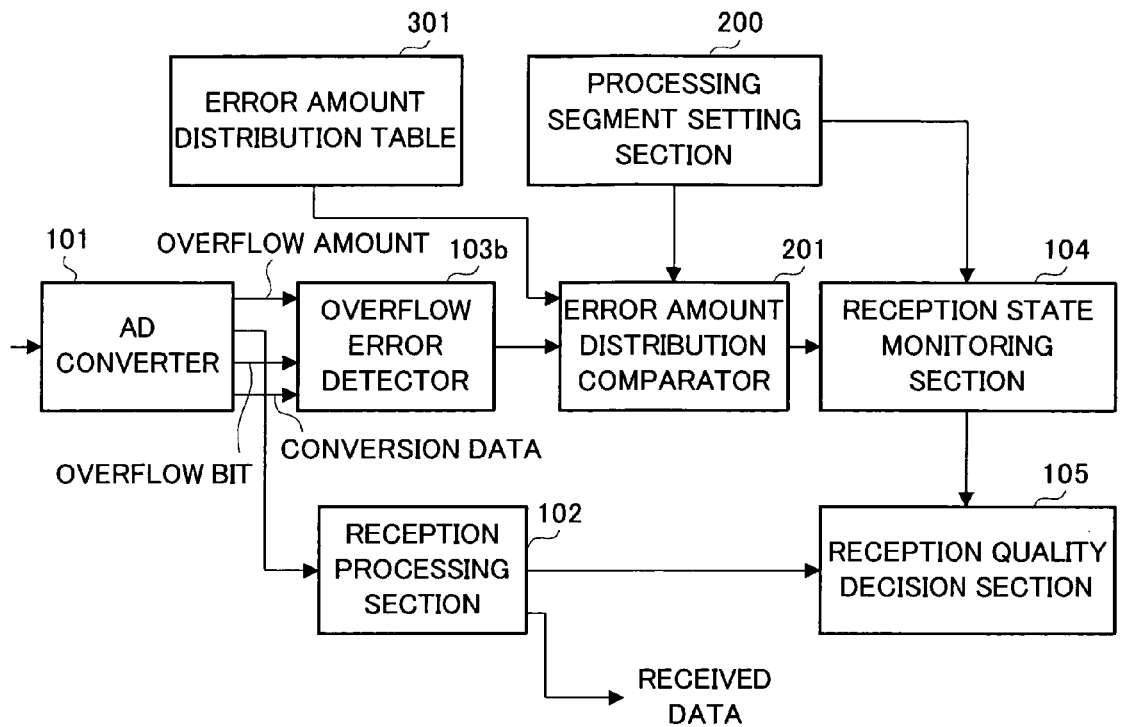
FIG. 6 is a block diagram showing a configuration of principal components of a CDMA communication apparatus according to Embodiment 4 of the present invention.

FIG. 6 is a block diagram showing a configuration of principal components of a CDMA communication apparatus (mobile terminal) according to Embodiment 4 of the present invention.

The configuration in FIG. 6 is basically the same as that in FIG. 4. However, it is different in that an error amount distribution table 301 and an error amount distribution comparator 401 are provided.

A feature of this embodiment is to examine the type of an overflow error using information on an error amount distribution acquired beforehand and apply the information on the examination result to an evaluation of quality of a received signal.

Figure 7:
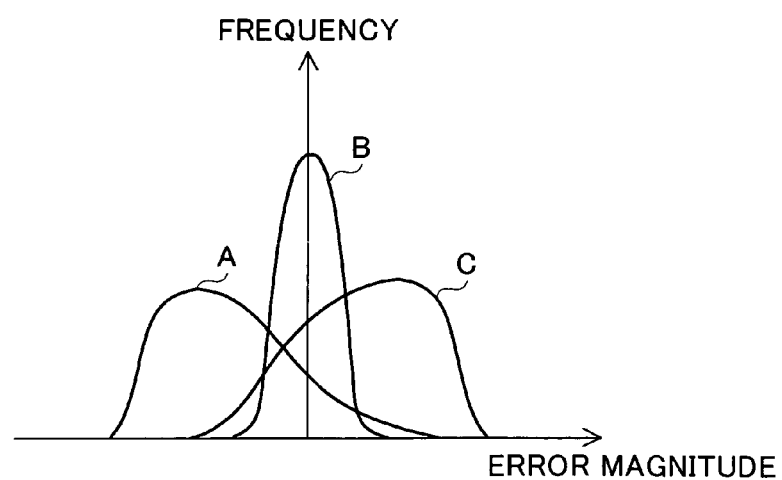
FIG. 7 illustrates an example of error amount distribution stored in the error amount distribution table in FIG. 6.

The error amount distribution table 301 stores information on the error frequency distribution with respect to the magnitude of an overflow error (error amount) as shown in FIG. 7.

In FIG. 7, distribution A, distribution B and distribution C have characteristic shapes and suppose cases where these distributions are likely to occur are already known through an analysis based on statistics.

The error amount distribution comparator 401 stores information such as the facts that overflows have occurred, occurrence timings and amounts of overflow in a segment set by the processing segment setting section 200 and acquires information on the frequency distribution with respect to the magnitude of errors, compares the distribution with the distribution stored in the error amount table 301 and decides the degree of similarity between the two.

If the result confirms the similarity to the distribution stored in the error amount distribution table 301, it is possible to estimate the cause for the error and the environment in which the mobile terminal is currently located, etc.

For example, it is possible to estimate whether such an error is extemporaneous or lasts considerably long.

By taking into consideration such error distribution information, too, it is possible to decide the validity/invalidity of the received signal more efficiently and more comprehensively.

Figure 8:
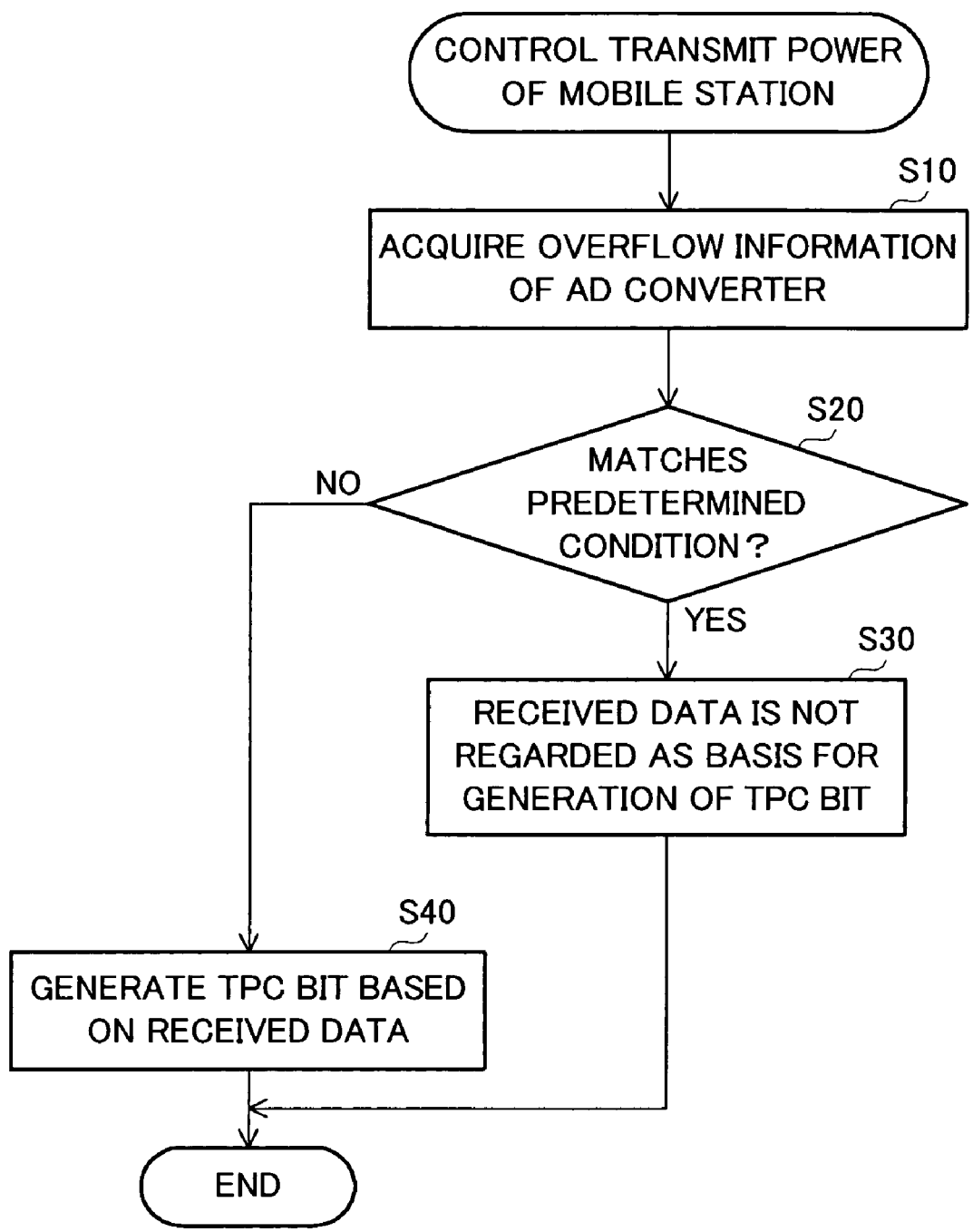
FIG. 8 is a flow chart showing a characteristic operation procedure in the CDMA communication apparatus corresponding to Embodiments 1 to 4.

The features of the transmit power control procedure at the reception apparatus explained in Embodiments 1 to 4 above are summarized as shown in the flow chart in FIG. 8.

That is, information on an overflow of the AD converter is acquired (step S10) and it is decided whether the information matches predetermined conditions or not (step S20).

For example, it is decided whether the information matches predetermined conditions or not such as whether an overflow lasts for a predetermined period or not, whether overflows occur a predetermined number of times or more for a predetermined period of time, whether errors exceeding a predetermined error amount occur a predetermined number of times or more, or whether errors occur in a distribution similar to a distribution acquired beforehand or not, etc.

If the information matches the predetermined condition, the received data is removed from the basis of generation of TPC bits (step S30) and a TPC bit is generated based on received data otherwise (step S40).

Adopting such a method makes it possible to take into consideration even errors of the received signal (conversion error or latent error due to overflows of the AD converter) which have been conventionally completely overlooked, decide the validity/invalidity of the received signal and generate a TPC bit precisely and thereby lessen the deterioration of accuracy of transmit power by latent errors.

This reduces adverse influences on the entire CDMA system. Thus, it is possible to minimize the possibility that the terminal (or base station) may perform transmit power control including errors due to wrong control information.

Embodiment 5

This embodiment is characterized by using information on overflows of an AD converter not only for deciding reception quality but also for feedback control of the circuit characteristic. That is, this embodiment is intended to expand the range of utilization of error information of an AD converter and positioned as an application example which continues to use the configuration of the aforementioned embodiments with further added functions.

Figure 9:
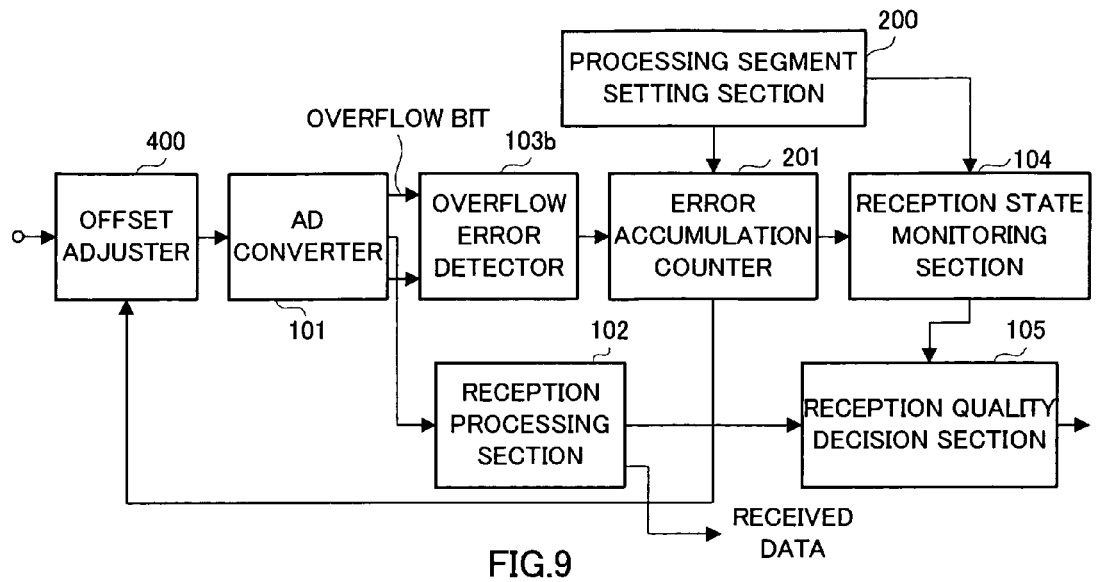
FIG. 9 is a block diagram showing a configuration of principal components of a CDMA communication apparatus according to Embodiment 5 of the present invention.

First, as a first example, the configuration of a reception apparatus in FIG. 9 is basically the same as the configuration in FIG. 4, but it is different in that the output of an error accumulation counter 201 is fed back to an offset adjuster 400.

Figure 10:
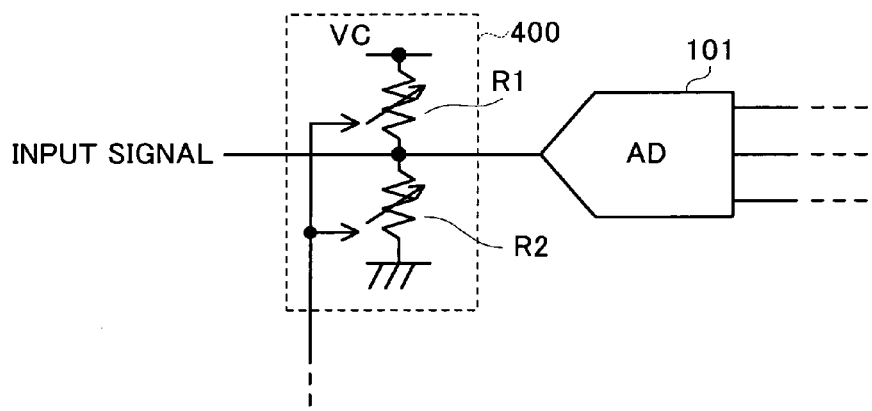
FIG. 10 illustrates an example of a configuration of a circuit that determines a DC bias at an input end of the AD converter in FIG. 9.

As shown in FIG. 10, the offset adjuster 400 is a circuit that divides a voltage VC using two variable resistors R1 and R2 to generate a DC bias at the input end of an AD converter 101.

This DC bias is set only when the product is shipped, but a DC bias may change and an offset may be produced due to variations over time under actual use.

Figure 11:
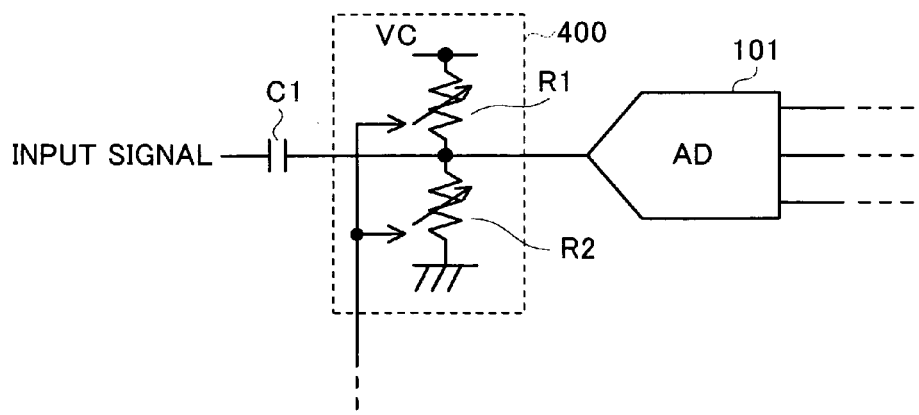
FIG. 11 illustrates an example of a circuit configuration for adjusting an offset inside the AD converter in FIG. 9.

Furthermore, as shown in FIG. 11, when a signal is input through a DC cut capacitor C1, an offset may be produced in the AD converter 101.

This may be a cause for generation of an overflow at the AD converter 101. In such a case, adjusting a DC offset may lessen the generation of overflows at the AD converter 101.

Thus, according to the reception apparatus in FIG. 9 to FIG. 11, the output of an error accumulation counter 201 is fed back to the offset adjuster 400 to adjust resistance values of the variable resistors R1 and R2 and reduce the DC offset.

Figure 12:
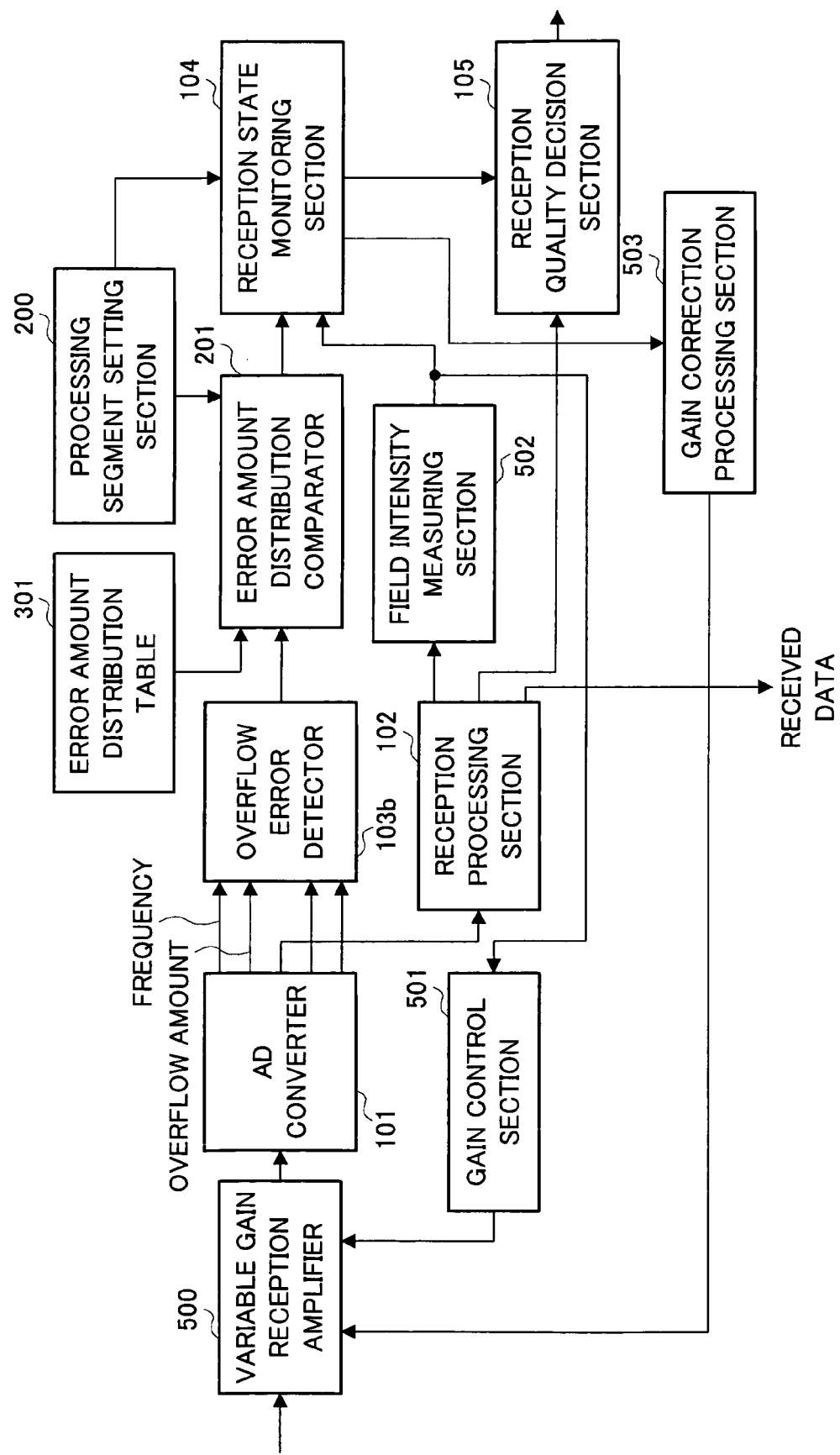
FIG. 12 is a block diagram showing another example of the CDMA communication apparatus according to Embodiment 5 of the present invention.

Then, as a second example, FIG. 12 shows an example of using information on overflows of the AD converter for AGC (auto gain control).

The basic configuration of the reception apparatus shown in FIG. 12 is the same as that in FIG. 6. However, in FIG. 12, it is different in that the information on overflows of the AD converter 101 is used for AGC (fine adjustment of the gain of a variable gain reception amplifier 500 which is provided before the AD converter 101).

In FIG. 12, the gain of the variable gain amplifier 500 by a normal AGC loop is adjusted through the reception processing section 102, field intensity measuring section 502 and gain control section 501.

In FIG. 12, in addition to this normal AGC group, a gain correction loop that passes through the error amount distribution comparator 401, reception state monitoring section 104 and gain correction processing section 503 is formed.

This gain correction loop is a high-speed AGC loop (SIR measurement, etc., such as a normal AGC loop is not required) by extremely simple signal processing which is principally based on error information of the AD converter 101 and serves as simple and high-speed fine adjustment of gains.

High-speed and appropriate fine adjustment of gains of the variable gain reception amplifier 500 leads to a reduction of generation of overflows of the AD converter 101.

In FIG. 12, the information of the field intensity measuring section 502 is also given to the reception state monitoring section 104, and therefore it is also possible to take into consideration the information on the field intensity in carrying out the above described gain adjustment.

Furthermore, it is also possible to take into consideration not only overflow error information but also information on the reception field intensity in evaluating reliability of the received signal.

Thus, the information on overflows of the AD converter can be applied not only to a decision on the validity/invalidity of the received signal but also to characteristic control of the circuit.

Since the information on overflows of the AD converter can be acquired quickly and easily immediately after an AD conversion, making the most of this information allows an unprecedentedly fast fine adjustment of the circuit with a simple configuration.

Thus, applying overflow information of the AD converter not only to generation of control bits for carrying out transmit power control but also to a fine adjustment of the bias at the input end of the AD converter and reception amplifier makes it possible to guarantee reliability of the CDMA communication system with a simple configuration and enhance the performance of the CDMA communication apparatus.

In the foregoing explanations, the case where the present invention is mainly applied to a mobile terminal has been described, but it goes without saying that the present invention can also be applied to the base station side.

As explained above, using the present invention makes it possible to check reliability (validity/invalidity) of received data taking into consideration an amount of latent errors caused by overflows of the AD converter and generate appropriate TPC bits. That is, it is possible to increase the accuracy of feedback information for the base station, etc.

That is, it is possible to minimize the possibility that the base station or mobile terminal will carry out transmit power control including errors based on control information containing latent errors. This guarantees an extremely stable operation of the CDMA communication system and also lessens the danger that the system may fail.

As the measure to prevent overflows of the AD converter, a high bit AD converter with a wide dynamic range may be used, but the high bit AD converter is very costly and implementing such an AD converter involves many problems such as increases in power consumption and the mounting area. From such a standpoint, too, the present invention provides highly stable performance for power control used in a CDMA scheme system control using a spread spectrum scheme in a simple manner and is extremely effective. Furthermore, the present invention also contributes to a reduction in size and cost of a portable terminal.

This application is based on the Japanese Patent Application No. 2002-079494 filed on Mar. 20, 2002, entire content of which is expressly incorporated by reference herein.

INDUSTRIAL APPLICABILITY

The present invention is preferably applicable to a mobile station apparatus and base station apparatus, etc., in a mobile communication system.

What is claimed is:

1. A method of controlling generation of transmit power control information for wireless communications, comprising:
    acquiring, when the level of a signal received by a mobile terminal causes overflow at an analog to digital converter provided at an input stage of the mobile terminal, information on frequency distribution with respect to the amount of the overflow, and information on at least one of a frequency of the overflow and an amount of the overflow;
    determining reliability of the received signal based on the acquired information; and
    excluding the received signal with reliability determined to not meet a predetermined criteria from basic data for generation of the transmit power control information.

2. A wireless mobile terminal for performing transmit power control in a closed loop mode with a base station, comprising:
    an analog to digital converter that is provided at an input stage of the wireless mobile terminal and that is caused to overflow by a level of a signal received by the wireless mobile terminal;
    a reception state monitor that acquires information on frequency distribution with respect to the amount of the overflow, and information on at least one of a frequency of the overflow and an amount of the overflow;
    a reception quality decision section that determines reliability of the received signal based on the information acquired by the reception state monitor; and
    a transmit power control information generator that generates transmit power control information to be sent to the base station,
    wherein as a result of the determination by the reception quality decision section, the received signal with reliability determined to not meet a predetermined criteria is excluded as basic data for generation of transmit power control information by the transmit power control information generator.

3. A wireless mobile terminal for performing transmit power control in a closed loop mode with a base station, comprising:
    an analog to digital converter that is provided at an input stage of the wireless mobile terminal and that is caused to overflow by a level of a signal received by the wireless mobile terminal;
    a reception state monitor that acquires information on frequency distribution with respect to the amount of the overflow, and information on at least one of a frequency of the overflow and an amount of the overflow;
    a reception quality decision section that determines reliability of the received signal based on the information acquired by the reception state monitor;
    a transmit power control information generator that generates transmit power control information to be sent to the base station; and
    an adjustment circuit that adjusts one of a direct current bias at an input end of the analog to digital converter and an amplification factor of a variable gain amplifier provided before the analog to digital converter for amplifying the received signal,
    wherein as a result of the determination by the reception quality decision section, the received signal with reliability determined to not meet a predetermined criteria is excluded as basic data for generation of transmit power control information by the transmit power control information generator,
    wherein one of the direct current bias at the input end of the analog to digital converter and the amplification factor of the variable gain amplifier is adjusted based on the information acquired by the reception state monitor.

4. A method of controlling characteristics of a wireless communications reception circuit based on overflow information, comprising:
    acquiring, when the level of a signal received by a reception apparatus causes overflow at an analog to digital converter provided at an input stage of the reception apparatus, information on frequency distribution with respect to the amount of the overflow, and information on at least one of a frequency of the overflow and an amount of the overflow; and
    adjusting, based on the acquired information, one of a direct current bias at an input end of the analog to digital converter and an amplification factor of a variable gain amplifier provided before the analog to digital converter for amplifying the received signal.

5. A wireless communications apparatus, comprising:
    an analog to digital converter that is provided at an input stage of the wireless communications apparatus and that is caused to overflow by a level of a signal received by the wireless communications apparatus;
    a reception state monitor that acquires information on frequency distribution with respect to the amount of the overflow, and information on at least one of a frequency of the overflow and an amount of the overflow; and
    a control system circuit that adjusts, based on the acquired information, one of a direct current bias at an input end of the analog to digital converter and an amplification factor of a variable gain amplifier provided before the analog to digital converter for amplifying the received signal.

* * * * *